Feb. 16, 1937. M. K. ALLEN 2,071,246
APPARATUS FOR ERECTING TANKS
Filed March 21, 1933 3 Sheets-Sheet 3
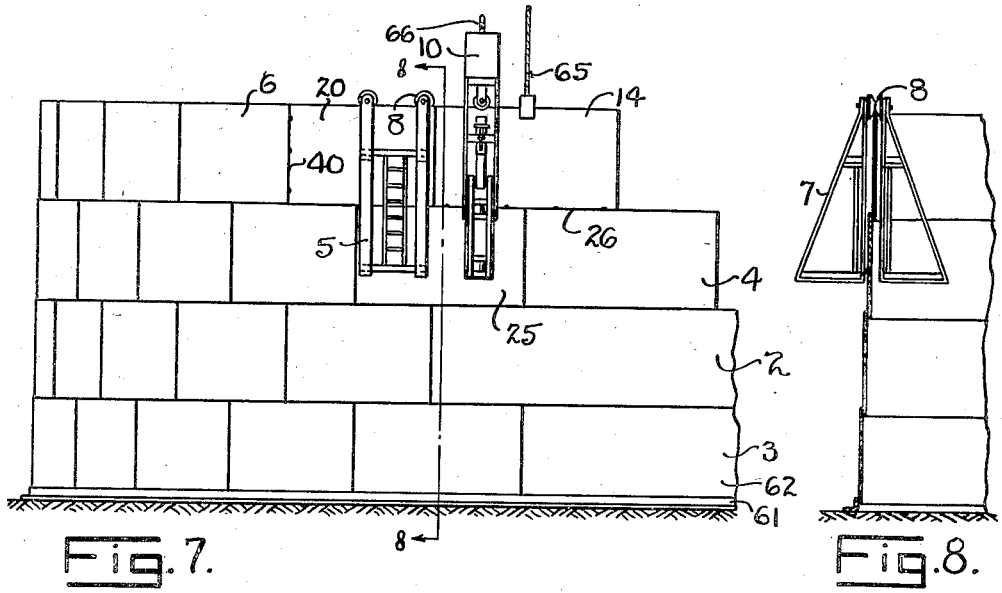
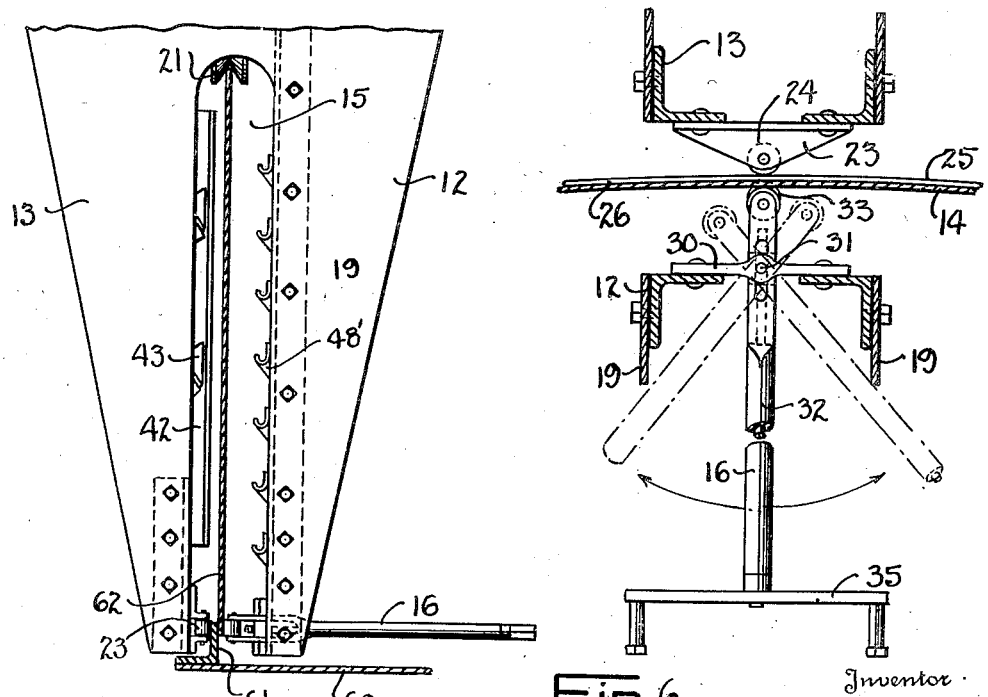
Inventor
MARVIN K. ALLEN.
Jesse R Stone
Lester B Clark
By
Attorneys.

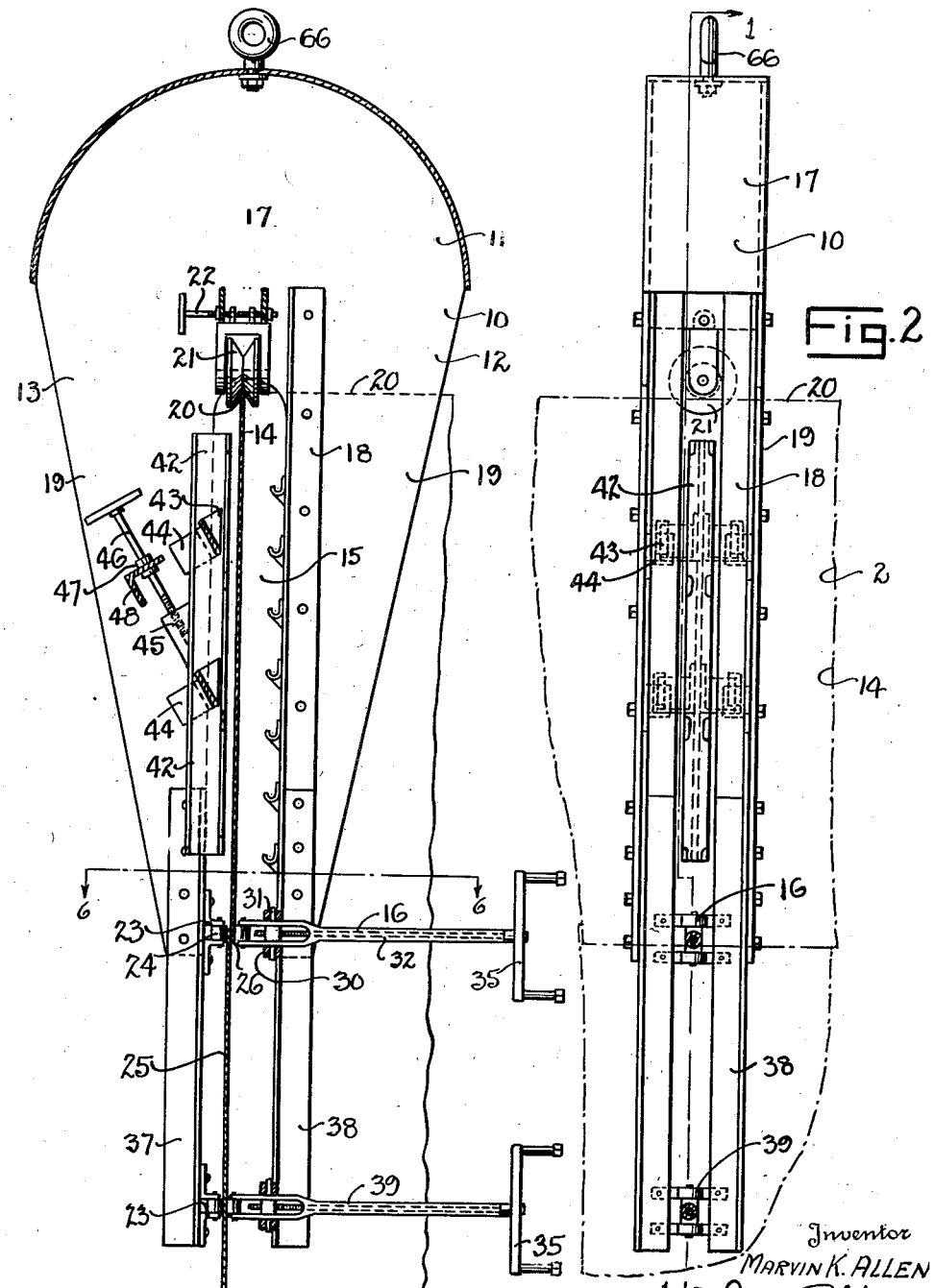

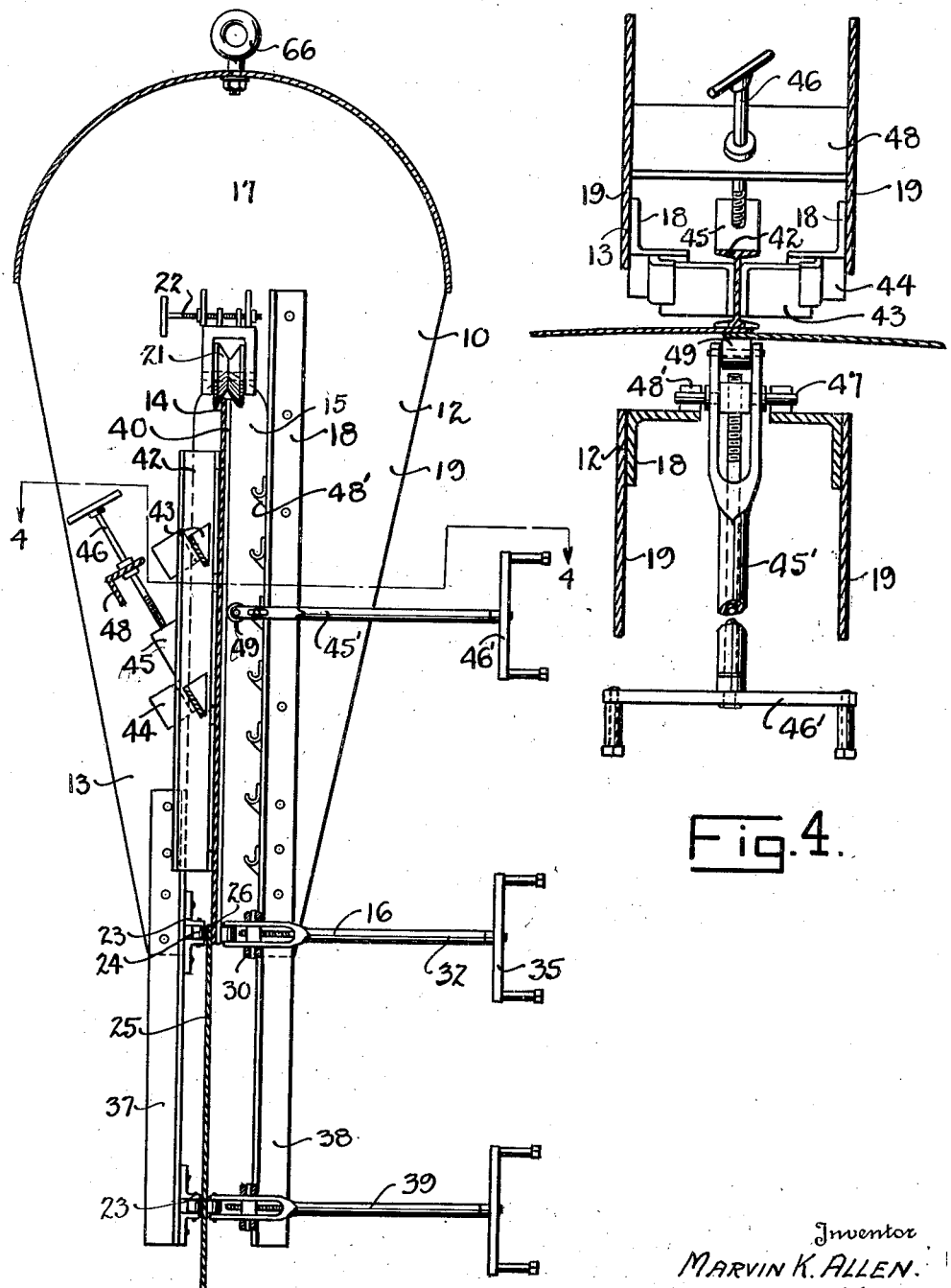

Patented Feb. 16, 1937

2,071,246

UNITED STATES PATENT OFFICE 2,071,246

APPARATUS FOR ERECTING TANKS

Marvin K. Allen, Houston, Tex.

Application March 21, 1933, Serial No. 661,995

8 Claims. (Cl. 113—99)

My invention relates to an improvement in an apparatus for erecting tanks, or welding plates together in assemblying a wall construction.

In the building of walls constructed of sheet metal plates it is quite important that the sheets be placed in proper alignment and firmly clamped together in order to accomplish the welding and riveting operations. Heretofore various types of brackets, clamps and clips have been utilized in attempting to hold the plates in position until they can be welded or riveted.

These constructions, however, have been found to be costly and it is one of the objects to improve both the method and the apparatus for performing such construction.

It is one of the objects of the invention to provide a combination carriage and clamp which may straddle the wall being erected for the purpose of clamping the plates in position to be welded and to also align the last positioned plate with those which have been incorporated in the wall.

It is one of the objects of the invention to provide a frame-work which may be mounted on the wall construction and used to clamp either the vertical or the horizontal seam which is to be welded or riveted.

It is another object of the invention to provide an apparatus which will cause the uppermost plate being positioned on a wall construction to be held in alignment with the plates already incorporated in the wall so that the last plate may be fixed in the wall construction in the proper alignment.

Another object of the invention is to provide a clamping apparatus which will engage opposite sides of the overlapping plates to be welded in order to hold them in firm engagement until they can be permanently affixed together.

A still further object of the invention is to provide an improved apparatus for erecting walls of sheet metal plates by aligning the plates being positioned with those previously included in the wall, and at the same time hold the last positioned plate so that it can be fixed in place.

A still further object of the invention is to provide a clamping apparatus which will obviate the necessity of welding or otherwise attaching brackets and clamps to the plates in order to position them and align them for the welding operation.

Other and further objects of the invention reside in the general arrangement and construction of the improved apparatus for erecting walls, as will be readily apparent from the following drawings, wherein:

Fig. 1 is a transverse sectional view of a wall construction showing the apparatus in position holding the uppermost plate in alignment and clamped ready for welding the horizontal seam. This view is taken on the line 1—1 of Fig. 2, looking in the direction of the arrows.

Fig. 2 is an elevation of the apparatus looking from the left of the construction as viewed in Fig. 1.

Fig. 3 is a view similar to Fig. 1 by showing the apparatus clamping the vertical seam and holding the top plate in alignment.

Fig. 4 is a sectional view taken on the line 4—4 of Fig. 3 and showing the arrangement of the vertical clamps.

Fig. 5 shows the apparatus in position and clamping the horizontal seam of the first or bottom plate being positioned in the wall.

Fig. 6 is a section taken on the line 6—6 of Fig. 1 and illustrating the horizontal clamp.

Fig. 7 is a diametrical view illustrating the method and apparatus as being applied in erecting a storage tank wall.

Fig. 8 is a section taken on the line 8—8 of Fig. 7, and showing the arrangement of the buggy for carrying the workman.

In the erection of sheet metal walls, it is usual to either rivet or weld the several plates in position, and it is, of course, necessary to both align and clamp the plates in proper position so that they can be fixed in the wall.

Fig. 7 shows a diagrammatic view of a wall which is indicated generally at 2, and which is made up of a plurality of individual plates 3. These plates are arranged in rings 4, which are assembled from the bottom, ring upon ring and plate next to plate, until a wall of the desired elevation has been obtained. It is, of course, necessary for the workman to travel at the elevation at which the operations are being performed, and a buggy 5 is usually mounted on the top edge of the uppermost ring or plate 6. This buggy may take any desired form and is seen in Figs. 7 and 8 as embodying a frame-work 7 having rollers or wheels so that it can be rolled laterally along the wall. It is intended that the welder or operator will be on this buggy and that the buggy will be moved to a position convenient for the workman. The provision of these buggies avoids the construction of a continuous scaffold supported on the wall or a scaffold built up from the ground.

Heretofore, clamps or clips have been welded or riveted to each of the plates which is to be positioned in the wall and these clips or brackets used in clamping the plate in position to be welded. In view of the fact that a great many of these clips had to be welded to the plates in order to obtain the proper clamping action, the expense of erecting a wall or tank has been enormously increased.

The present invention is illustrated diagrammatically as an apparatus or carriage 10 in Fig. 7. This carriage is best seen in alignment and clamping position in Figs. 1, 2 and 3 and embodies a frame or body 11. This frame as embodied in the present disclosure, includes the legs 12 and 13 which are separated to form the space 15. This space receives the plate 14 during use of the apparatus.

The legs 12 and 13 are shown as downwardly tapering in order to absorb the increasing moment to be applied at the lower ends of the legs by virtue of the clamping mechanism 16. This moment must be absorbed by the legs and transmitted to a bridge or head 17 of the apparatus. In other words, the apparatus is an immense clamp which is placed over the edge of the plate and extends downwardly to the base of the plate to hold it in position during the welding or riveting operation. It is intended, of course, that the legs 12 and 13 and the bridge 17 will be constructed of suitable structural shapes or of cast or forged material so that they will withstand enormous stresses.

Fig. 2 shows the legs made up of angle iron and reinforced with suitable plates, the angles being indicated at 18 and the plates at 19.

In order to mount the apparatus for movement along the upper edge 20 of the plate 14, a roller 21 is mounted in the bridge 17. This roller is adjustable laterally by the screw mechanism 22 so that adjustment may be made in order to obtain the proper alignment in accordance with the circumstances being encountered.

The lower end of the leg 13 is provided with an abutment which may be provided with a roller 24. This construction is merely illustrative of any abutment which may be provided at this location in order to absorb the thrust of the clamp 16. This abutment, made up of parts 23 and 24, may be adjustable as to elevation with respect to the frame so as to accommodate different widths of plates. It is intended, however, that this abutment will be positioned at such elevations when the roller 21 is in position on the top of the plate that the abutment will be at the same elevation as the lower edge of the plate. As seen in Fig. 1, this abutment is engaging the plate 25 to which the plate 14 is being attached, the overlapping edges of these two plates constituting the horizontal seam 26 which is to be welded or riveted.

The leg 12 has attached to its lower end the clamp 16 which comprises a body 30 connected to the leg and which carries a pivot 31 to support the clamp arm 32. This arm is best seen in Fig. 6 and is arranged for horizontal swinging movement on the pivot 31 so that the inner end which carries the roller or contact piece 33 may be moved into engagement with the overlapping plates forming the seam 26.

In order to obtain a secure and firm clamping action, the inner end of this arm 32 is adjustable by rotation of the crank 35. The detail of this adjustable construction is best seen in Fig. 4. When the handle 32 is moved to the position of Fig. 6 after its proper adjustment, the seam 26 is firmly clamped between the abutment 23 and the roller 33. The two plates are held firmly together and the welding operation may be made on either side of the apparatus if desired.

In many instances, however, when the new plate to be fixed in position is first placed, it is not aligned with the previously fixed plates and it is desirable to properly align such plate 14 at the time it is being welded or riveted in position. To accomplish this, the extension members 37 and 38 are attached to the legs 13 and 12, respectively. These extensions carry a clamp 39 which is identical in all respects with the clamp 16 shown in Fig. 6. This clamp is operated in a manner similar to the one just described, but it seems apparent that when this lower clamp 39 is tightened that the frame, due to the mounting of the wheel 21, will be firmly engaged with the plate 25 which has previously been fixed as part of the wall, so that the plate 14 will be brought into proper vertical alignment ready to be fixed in position, it being understood that the screw member 22 has previously been adjusted so that when the clamp 39 is tightened that the seam 26 will be in proper alignment upon tightening of the clamp 16.

From the foregoing construction and description it seems apparent that this carriage 10 can be moved along the top 20 of the uppermost ring of plates and the welding operation can proceed either ahead or behind the apparatus after the same has been clamped in position.

When the horizontal seam has been welded or riveted, it is desirable to fix the vertical seam 40 and to accomplish this clamping action the construction shown in Figs. 1, 3 and 4 is used. Mounted on the leg 13 is a beam or plate 42 which has fixed thereon the inclined brackets 43. These brackets 43 engage the lugs 44 carried by the plate 19 of the leg 13. Two of these constructions are shown so that the beam 42 will ride against these lugs 44. Attached to the beam 42 is the threaded boss 45 which receives the operating stem 46 which is threaded into the boss. The stem 46 is carried by a bearing 47 mounted in the support 48 on the plate 19. It seems obvious from this construction that rotation of the stem 46 will cause diagonal movement of the plate 42 so that as it moves downwardly it will engage with the plate 14 and exert a thrust thereagainst if the stem 46 is rotated a sufficient amount. It is intended, however, that this construction will be operated under the conditions shown in Fig. 3 wherein the apparatus 10 is positioned directly against the vertical seam 40. When in this position the plate 42 will be run down by rotation of the stem and moved into contact with the plate 14.

It is intended that the plate or beam 42 will merely serve as a support against which the seam will be caused to abut by means of the lever 45'. This lever is adjustable as to length by rotation of the crank 46' thereon and is provided, as seen in Fig. 4, with a cross-brace or rod 47. It is this rod that is adjustable along a part of the length of the lever 45'. This rod 47 extends from either side of the lever 45' and is adapted to be received in the bearings 48', a plurality of which have been positioned upon the leg 12. In this manner the lever 45' is merely dropped into position with the rod 47 in the bearings 48'. It is then pivoted vertically until the roller or contact portion 49 thereof engages the outermost plate of the seam 40. Vertical swinging movement of the lever causes a clamping action, and the welding or riveting may then be performed.

Figs. 1 and 3 show a plurality of the bearings 48'. These have been provided so that this lever 45' may be used as a clamp along the entire length of the vertical seam.

Fig. 5 shows an arrangement of the apparatus when the erection of the wall is being instituted. The base or foundation for the wall is indicated at 60, the usual construction being to position an angle or channel member 61 on the foundation, and it is on the upstanding leg of this angle that the wall is attached.

The first ring of plates or the first plate is indicated at 62 and is clamped in position by the abutment 23 and the clamp 16 which have been previously described. It will be noted, however, that in this figure of the drawings, the extensions 37 and 38 have been removed. This change has been effected in order to permit the apparatus to rest on the top of the plate 62 and when the clamp 16 is tightened then the wheel 21 will be caused to move into vertical alignment with the base of the apparatus so that the plate 62 will be properly aligned. As soon as the lowermost seam has been completed, then the extensions 37 and 38 will be added and the apparatus function as described in connection with the previous figures of the drawings.

The construction and operation of the parts are believed to be understood, it being contemplated that a crane or hoisting connection 65 will be used to position the plates on top of the wall and that the ring 66 in the top of the apparatus may be engaged by this crane when it is desired to shift the apparatus from one elevation or position to another.

It is well understood that one or two lugs may be attached to the end of the plates in order to eliminate the amount of overlapping of the plates and rests the overlapping plates one upon the other until they can be either spot welded or fixed in position by the rivets. If, however, spot welding is not contemplated, the present clamping apparatus may be moved into position and used at once, either with or without previous fixing of the plate in position because of the advantage to be obtained by the apparatus aligning the plates.

While one form of the invention has been shown and described, it is contemplated that the invention will include any other apparatus falling within the scope of the appended claims.

What I claim as new is:

1. A device for use in erecting tanks including a frame, means to support said frame on the tank plates assembled for welding, means on said frame to clamp said plates in vertically aligned position to be welded, and additional means to clamp said frame to the previously erected plates to maintain such alignment.

2. A frame for use in erecting tanks to clamp the plates in position to be welded including a frame to straddle the plate to be welded, a roller support on said frame, a beam and a pivoted arm both of which are adjustable on said frame to engage and hold the vertical edges of both the erected and the added plates in position so that the added plates will be held in alignment to be welded.

3. An apparatus for aligning and clamping sheet metal plates in position to be welded in a wall construction including a frame composed of two leg members and a bridge joining the upper ends of said members; a roller to support said frame on the upper edge of the plate, said roller being adjustable laterally to align said frame with the previously constructed wall, clamping members carried by the lower ends of said legs to fix the frame in position, and seam clamping members also carried by said legs to hold the overlapped edges of the adjacent plates in contact with each other to be welded.

4. An apparatus for aligning and clamping sheet metal plates in position to be welded in a wall construction including a frame composed of two leg members and a bridge joining the upper ends of said members; a roller to support said frame on the upper edge of the plate, said roller being adjustable laterally to align said frame, clamping means carried by the lower ends of said legs to fix the frame in position, and seam clamping means also carried by said legs to hold the overlapped edges of the adjacent plates in contact with each other to be welded, and an additional clamping means to hold the vertical seam in position to be welded.

5. In a sheet metal erecting device, a frame to straddle the plates being erected, means to fix said frame in alignment with the erected plates, a diagonally adjustable beam on one side of said frame to be moved against the plate being positioned, and an adjustable arm pivoted on the other side of said frame opposing said beam whereby the vertical seam may be clamped for welding.

6. In a device of the character described to clamp flexible plates in a vertical plane, a frame, means thereon to clamp the vertical seam of the plates to be welded, and additional means on said frame to clamp the horizontal seam and the previously erected plates.

7. In a device of the character described a frame, means thereon to clamp the vertical seam of the plates to be welded, additional means on said frame to clamp the horizontal seam, and means also on said frame to clamp the previously erected plates so that both of said means will be brought into alignment with such erected plates.

8. In a device of the character described a frame, three sets of plate engaging members thereon, one to clamp the vertical seam, one to clamp the horizontal seam, and one to align the other two sets and the frame with the wall being erected.

MARVIN K. ALLEN.